United States Patent [19]

Wu

[11] Patent Number: 5,752,793
[45] Date of Patent: May 19, 1998

[54] SECURING INSERT OF A LOCKNUT

[75] Inventor: Shui-Sheng Wu, Kaohsiung, Taiwan

[73] Assignee: Doumo Industrial Company, Kaohsiung, Taiwan

[21] Appl. No.: 804,251

[22] Filed: Feb. 21, 1997

[51] Int. Cl.⁶ .................................................. F16B 39/34
[52] U.S. Cl. ........................................ 411/303; 411/947
[58] Field of Search .......................... 411/301–303, 324, 411/947

[56] References Cited

U.S. PATENT DOCUMENTS

| | | | |
|---|---|---|---|
| 2,727,551 | 12/1955 | Rees | 411/303 |
| 3,221,790 | 12/1965 | Poupitch | 411/301 |
| 3,353,580 | 11/1967 | Benjamin | 411/303 |
| 3,437,118 | 4/1969 | Coyle | 411/302 |
| 4,165,194 | 8/1979 | Flower | 411/303 |

FOREIGN PATENT DOCUMENTS 822743  11/1951  Germany ............................ 411/302

*Primary Examiner*—Flemming Saether
*Attorney, Agent, or Firm*—Holland & Hart LLP

[57] ABSTRACT

A locknut which is durable and adapted to be used repeatedly is disclosed. The locknut has a body with a collar integrally extending from one end thereof for receiving a check washer. The check washer defines a polygonal hole therein. A periphery defining the polygonal hole is composed of a plurality of long edges and short beveled edges each arranged between two adjacent long edges. A length of each long edge is slightly smaller than an internal diameter of the body. By this arrangement, the extrusive portion of the long edges resulted from the thread of a bolt can be dispersed toward the short beveled edges to avoid a fracture of the check washer, thereby to maintain an effective elastic comeback of the check washer.

2 Claims, 3 Drawing Sheets

SECURING INSERT OF A LOCKNUT

BACKGROUND OF THE INVENTION

1. Field of the Invention

The present invention relates to a locknut, and more particularly to a locknut which is durable and adapted to be used repeatedly.

2. Description of Related Art

An early nut generally employs a spring washer mounted thereunder which provides an upward elastic force to enhance retention of the nut and prevent the nut from being separated from a bolt when it is subject vibrations. The principle of this kind of nut is to improve the friction force between thread of the nut and the bolt by means of the elastic force provided by the spring washer. However, such a locking effect is limited.

Another kind of spring cap nut generally utilizes spring detents spaced thereon to strengthen the friction force between thread of the nut and the bolt to prevent the nut from being separated from the bolt when vibration occurs. This kind of nut still has an inefficient locking effect because the metal contact portions of the nut and the bolt decreases the strengthened friction force.

Recently, a kind of locknut 40 is introduced, as shown in FIG. 6 and FIG. 7, wherein the locknut 40 has a check washer 41 received therein. The check washer 41 is made of nylon and defines a central hole 411 therein aligned with a screw hole 42 of the locknut 40. A diameter of the central hole 411 is slightly smaller than that of the screw hole 42. By this arrangement, the check washer 41 will meet with outward extrusion when a bolt 30 is threaded into the screw hole 42 of the locknut 40 and the locknut 40 will be locked by means of a tight fit resulted from a diameter-expanded deformation of the check washer 41. This locknut 40 still has a disadvantage that the diameter-expanded deformation of the check washer 41 will be a permanent deformation such that the locking effect will decrease after it is used for a long period of time.

The present invention provides an improved locknut to mitigate and/or obviate the aforementioned problems.

SUMMARY OF THE INVENTION

One object of the present invention is to provide a locknut which is durable and adapted to be used repeatedly.

In accordance with one aspect of the present invention, a locknut comprises a body and a check washer. The body has a collar integrally extending from one end thereof for receiving the check washer. The check washer defines a polygonal hole therein. A periphery defining the polygonal hole is composed of a plurality of long edges and short beveled edges each respectively arranged between two adjacent long edges.

In accordance with another aspect of the present invention, a length of each long edge is slightly smaller than an internal diameter of the body.

Other objects, advantages and novel features of the invention will become more apparent from the following detailed description when taken in conjunction with the accompanying drawings.

DETAILED DESCRIPTION OF PREFERRED EMBODIMENT

Figure 1:
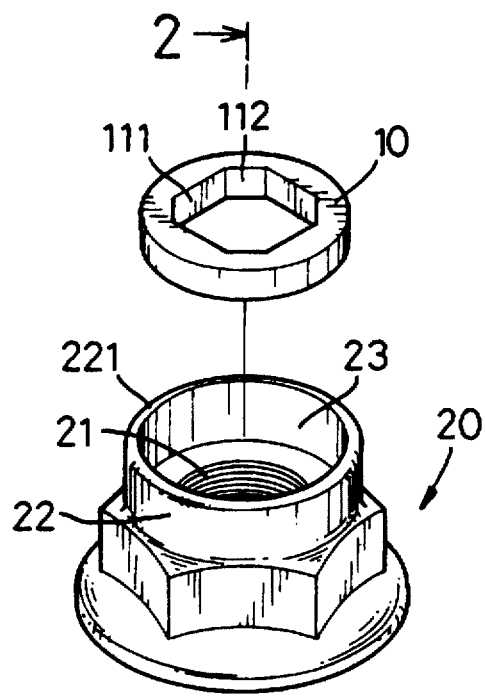
FIG. 1 is an exploded view of a locknut in accordance with the present invention.

Referring to FIG. 1, a locknut in accordance with the present invention comprises a body 20 and a check washer 10. The body 20 defines a screw hole with a thread 21 therein for receiving a bolt 30 (see FIG. 5) and has a collar 22 integrally extending from one end thereof. The collar 22 defines a counterbore 23 therein which has a diameter slightly larger than that of the screw hole. The check washer 10 is made of nylon or similar materials and is received within the counterbore 23 of the collar 22. The check washer 10 has a certain thickness and defines a polygonal hole (not numbered) therein. A periphery 11 defining the polygonal hole may be composed of an odd number or an even number of edges. In a preferred embodiment shown in FIG. 1, the polygonal hole is an octagonally-sided hole, that is, the periphery defining the polygonal hole is composed of two pairs of opposed long edges 111 and four short beveled edges 112 each arranged between two adjacent long edges 111. A length of each long edge 111 is slightly smaller than the inner diameter of the screw hole of the body 20.

Figure 2:
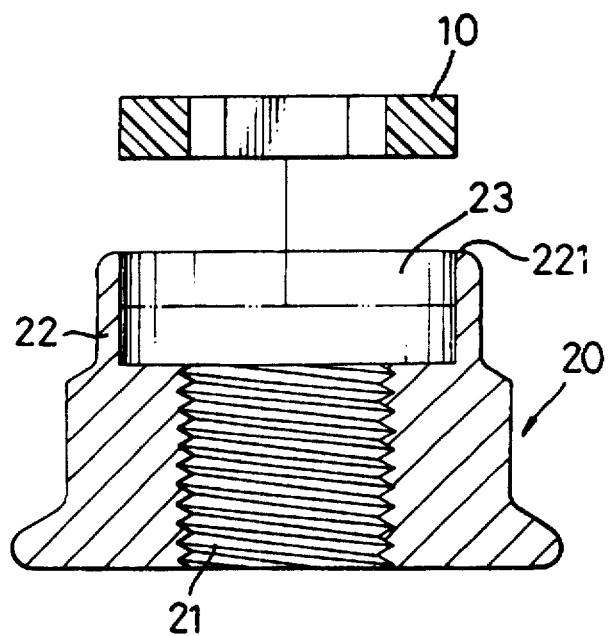
FIG. 2 is a cross-sectional view of the locknut taken along lines 2—2 of FIG. 1.
Figure 3:
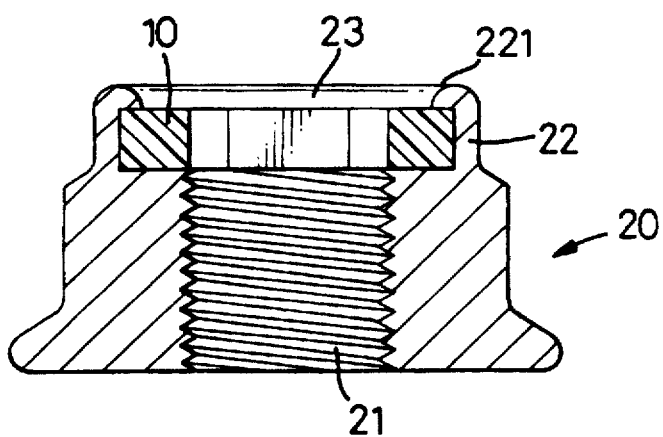
FIG. 3 is a cross-sectional view of the locknut of the present invention, showing a check washer of the locknut.

Referring to FIG. 2 and FIG. 3, before the bolt is engaged with the body 20, the check washer 10 is firstly received in the counterbore 23 of the collar 22. By means of impactedly forging an outer periphery 221 of the collar 22, a top portion of the outer periphery 221 will be curved inwardly to securely grip the check washer 10.

Figure 4:
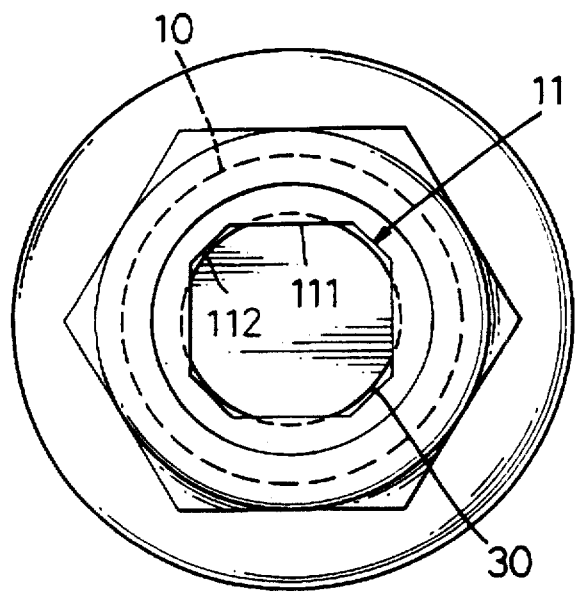
FIG. 4 is a top view of the locknut of the present invention.
Figure 5:
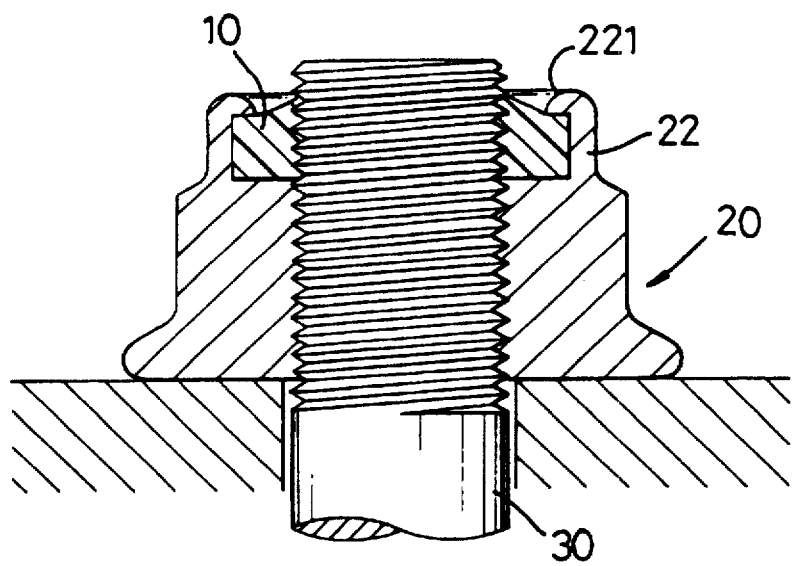
FIG. 5 is a cross-sectional view of the locknut of FIG. 1, showing the operation of the locknut being engaged with a bolt.
Figure 7:
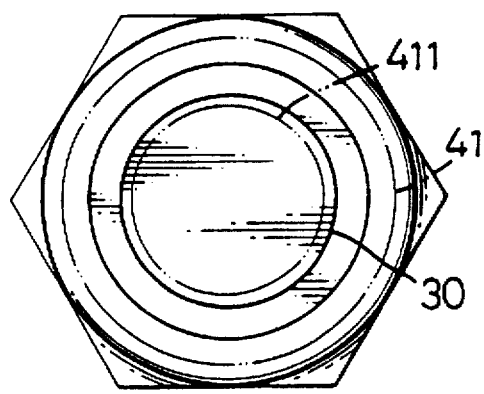
FIG. 7 is a top view of the conventional locknut of FIG. 6.
Figure 6:
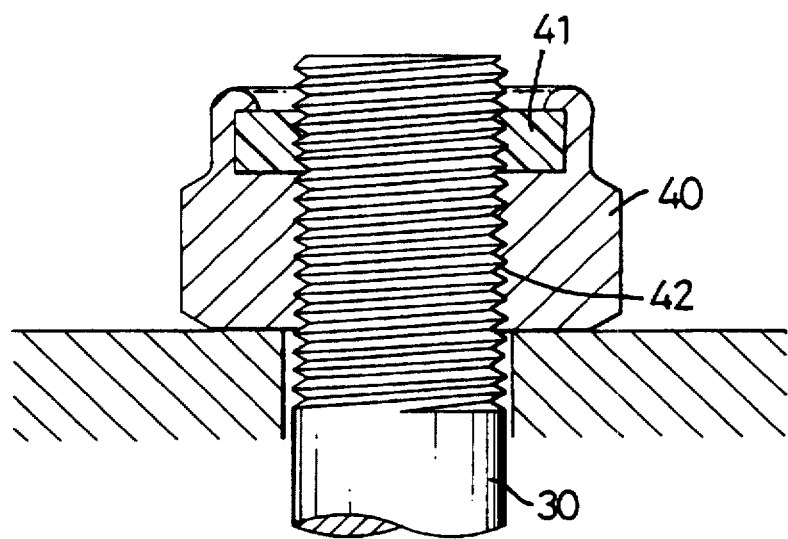
FIG. 6 is a cross-sectional view showing the operation of a conventional locknut being engaged with a bolt.

Referring to FIG. 4, since a distance between each pair of opposed long edges 111 is slightly smaller than the inner diameter of the screw hole of the body 20, the opposed long edges 111 will meet with outward extrusion when the bolt 30 is threaded into the screw hole of the body 20, as shown in FIG. 5. Also, since the short beveled edges 112 are provided, the extrusive portion of the long edges 111 can be dispersed toward the beveled edges 112 to avoid a fracture of the check washer 10, thereby maintaining an effective elastic come-back of the check washer 10.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A locknut comprising:
   a body having a collar integrally extending from one end thereof; and
   a check washer received within the collar of the body, said check washer defining a polygonal hole therein, a periphery defining the polygonal hole comprising a plurality of long edges and short beveled edges, each of said short beveled edges respectively arranged between two adjacent long edges.

2. A locknut as claimed in claim 1, wherein a length of each long edge is slightly smaller than an internal diameter of the body.

* * * * *